Feb. 10, 1925.
N. B. HURD
TRANSMISSION LOCK
Filed Jan. 26, 1924
1,525,993
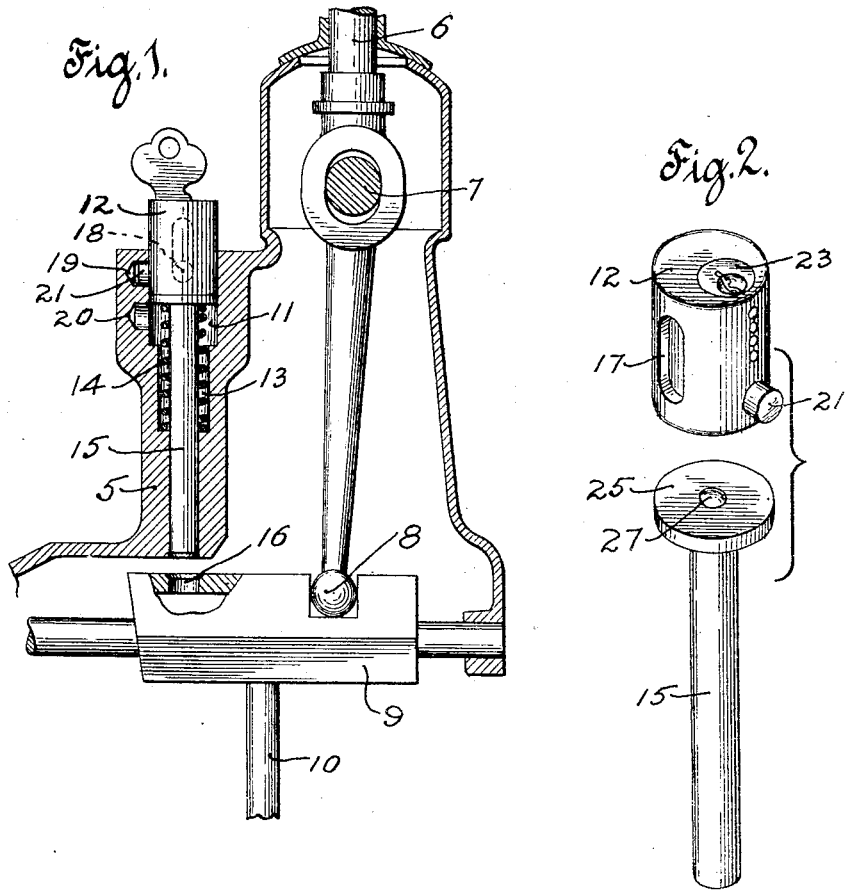
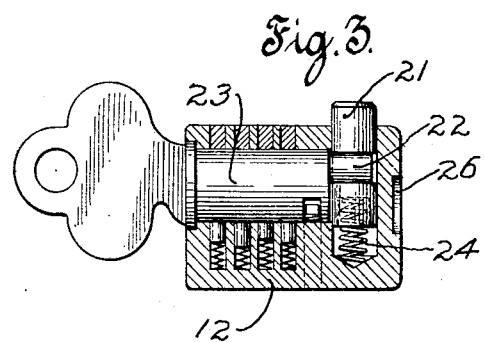
INVENTOR
NORMAN B. HURD
BY
Mitchell Brothers
ATTORNEYS.

Patented Feb. 10, 1925.

1,525,993

UNITED STATES PATENT OFFICE.

NORMAN B. HURD, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

TRANSMISSION LOCK.

Application filed January 26, 1924. Serial No. 688,649.

*To all whom it may concern:*

Be it known that I, NORMAN B. HURD, a citizen of the United States of America, residing at New Britain, Connecticut, have invented new and useful Improvements in Transmission Locks, of which the following is a specification.

My invention relates to a transmission lock and is particularly adapted for locking a movable part of an automobile transmission in the neutral position so as to prevent unauthorized persons from starting the car.

Heretofore it has been the practice to provide a locking finger for a movable part of an automobile transmission which finger was rigidly secured, as by means of riveting, to the inner end of a cylinder lock. The transmission casing or a similar part was bored, to receive the lock cylinder and the transmission locking finger. When the bores for receiving the cylinder lock and the transmission locking finger were not accurately formed so as to be concentric, or were slightly out of alignment, the lock cylinder or the transmission locking finger were caused to bind unduly, and one of the members was likely to stick and cause trouble. On the other hand, if the guide bores were properly formed but the transmission locking finger was set into the cylinder lock at a slight angle, the same binding would result.

It is the principal object of my invention, therefore, to provide a transmission lock of the character indicated in which the locking cylinder and the transmission locking finger may move freely without danger of binding.

In the preferred form of my invention, the transmission case or other suitable part is bored to receive a locking cylinder and a transmission locking finger. The transmission locking finger has a head or abutment at the upper end thereof, which head engages the inner end of the cylinder lock. The head and cylinder lock are, however, unattached to each other, so that the cylinder lock and transmission locking finger may be free to slide in their respective bores, each without hindrance by the other.

In the drawing I have shown, for illustrative purposes only, a preferred form of the invention.

Figure 1 is a fragmentary sectional view illustrating an application of the invention;

Figure 2 is an enlarged perspective view showing the cylinder lock and transmission locking finger relatively separated;

Figure 3 is a further enlarged sectional view of a preferred form of cylinder lock.

In said drawing, 5 represents a part of the transmission casing or the cover thereof. 6 is the usual gear shift lever, pivoted at 7 in the transmission case cover and having its inner end 8 operatively engaged with the shift fork 9, which shift fork is movable by means of the shifting lever 6. A rod or other device 10, secured to the fork 9, serves to shift one or more gears of the gear train (not shown).

In the preferred form of the invention the transmission case 5 is bored at 11, to receive a cylinder 12. The casing has a counterbored portion 13 for receiving an actuating spring 14, and the casing is further counterbored to receive the transmission locking finger 15, which extends into the casing. The fork 9 has a recess 16 for receiving the locking finger 15 when the fork is in one position, namely, the neutral position. The various bores in the case are preferably concentric with each other and the axes of the various parts are preferably coincident.

The cylinder 12 has a groove or keyway 17 for receiving a spline pin 18, so as to permit free sliding of the lock in its bore, but which pin prevents rotation of the cylinder. The casing is further provided with apertures 19, 20 for receiving a locking lug or pin 21, so as to hold the cylinder lock in either of two positions. In the form shown the locking pin 21 fits into a bore or seat in the lock cylinder, and is engaged by a pin 22 carried by the inner end of the plug 23 of the cylinder lock. A spring 24 urges the pin 21 outwardly.

The transmission locking finger 15 is provided at its upper end with some form of spring abutment, and in the form shown a disk head 25 is riveted to the upper end of the finger 15. The inner end of the cylinder lock is recessed, as at 26, to receive the riveted-over end 27 of the finger 15.

It should be noted that a very important feature of the present invention is that the transmission locking finger 15 and the cylinder lock are in operative engagement with, but are unattached to, each other so that each may slide freely in its own bore without binding.

When it is desired to lock the transmission, as when the operator of the car desires to leave the same for some time, the gear shift lever 6 is thrown into the neutral position as shown in Figure 1. The key is inserted into the cylinder lock and is rotated so as to withdraw the locking pin 21 from the seat 19, after which the cylinder 12 may be depressed against the compression spring 14, and during such depression the transmission locking finger 15 moves downwardly and into the receiving recess 16 in the fork 9. When the cylinder lock 12 is depressed, the key is released, so as to permit the pin 21 to enter the lower aperture 20, to hold the cylinder lock and transmission locking finger in their lowermost or locked positions. The key may then be withdrawn and it will be impossible to shift the fork 9 until the key is again inserted in the lock and the pin 21 withdrawn from the bore 20. The spring 14 will then, of course, tend to raise both the transmission locking pin 15 and the cylinder lock 12. Now, since the transmission locking finger 15 and the cylinder 12 are in engagement with each other, both will be actuated by the spring 14 and both are moved in the downward direction against the spring 14 by depressing the cylinder, so that the advantages of a unitary or rigid structure are attained. However, should the bores for receiving the cylinder and the transmission locking finger be slightly out of alignment, the fact that the cylinder and finger are unattached to each other will permit each to seek its own bore, and a proper sliding action will result without binding.

While I have described a preferred form of the invention, I do not wish to be limited thereto, for changes may be made within the scope of the appended claims.

I claim:

1. In a transmission lock and in combination with a transmission casing having a bore to receive a cylinder lock and a bore to receive a locking finger, a cylinder lock slidably but non-rotatably secured in said bore, a locking finger in said second mentioned bore, said locking finger being in engagement with but unattached to said cylinder lock, a spring for urging said locking finger and cylinder lock in one direction, and a locking lug for securing said cylinder and finger in one position.

2. In a transmission lock, a cylinder lock, a locking finger, a member having guides for said cylinder and locking finger, said locking finger having a head thereon, and a spring beneath said head for urging said locking finger and cylinder lock in one direction, said cylinder lock and locking finger being in operative engagement but unattached to each other, whereby said locking cylinder and said locking finger will be free to slide in the respective bores without binding.

3. In a transmission lock, a transmission casing having a bore, a cylinder lock in said bore and splined therein for slidable movement, a retractile locking lug carried by said cylinder lock for securing the same in one position, a locking finger slidably engaged in said transmission case and adapted when in one position to lock a moving part of a gear shift mechanism, said cylinder lock and transmission locking finger being in engagement but unattached to each other, and a spring for urging said finger and cylinder lock in one direction.

4. In a transmission lock, a locking cylinder having a manually controllable locking lug for holding the same in a locking position, a transmission locking finger having a head thereon in loose engagement with the inner end of said cylinder lock, means for urging said cylinder lock and transmission locking finger in an unlocking direction, and a member having bores for receiving and independently supporting and guiding said cylinder lock and transmission locking finger, said locking lug coacting with said member.

5. In a transmission lock, a locking cylinder, a transmission locking finger having a head riveted thereon, said head being in engagement with but unattached to said cylinder lock, a spring engaging one of said members for urging said transmission locking finger and cylinder lock in one direction, and a member having guide bores for receiving said cylinder lock and transmission locking finger.

NORMAN B. HURD.